United States Patent
Morimoto et al.

(10) Patent No.: US 10,124,950 B2
(45) Date of Patent: Nov. 13, 2018

(54) DISPERSING TRAY AND COMBINATION SCALE COMPRISING THE SAME

(71) Applicant: YAMATO SCALE CO., LTD., Akashi-shi, Hyogo (JP)

(72) Inventors: Koji Morimoto, Akashi (JP); Ryo Shimizu, Akashi (JP)

(73) Assignee: Yamato Scale Co., Ltd., Akashi-shi (JP)

( * ) Notice: Subject to any disclaimer, the term of this patent is extended or adjusted under 35 U.S.C. 154(b) by 189 days.

(21) Appl. No.: 15/175,544

(22) Filed: Jun. 7, 2016

(65) Prior Publication Data

US 2016/0362241 A1 Dec. 15, 2016

(30) Foreign Application Priority Data

Jun. 10, 2015 (JP) ................. 2015-117482

(51) Int. Cl.
| | | |
|---|---|---|
| *G01G 13/00* | (2006.01) | |
| *B65D 83/00* | (2006.01) | |
| *B67D 3/00* | (2006.01) | |
| *G01G 13/02* | (2006.01) | |
| *G01G 19/393* | (2006.01) | |
| *G01G 21/00* | (2006.01) | |
| *G01G 21/30* | (2006.01) | |

(52) U.S. Cl.
CPC .............. *B65D 83/00* (2013.01); *B67D 3/00* (2013.01); *G01G 13/003* (2013.01); *G01G 13/022* (2013.01); *G01G 19/393* (2013.01); *G01G 21/00* (2013.01); *G01G 21/30* (2013.01)

(58) Field of Classification Search
CPC .... G01G 13/003; G01G 13/022; G01G 21/00; G01G 21/23
See application file for complete search history.

(56) References Cited

U.S. PATENT DOCUMENTS

| | | | | |
|---|---|---|---|---|
| 4,483,462 A | * | 11/1984 | Heintz ................... | G01G 13/16 141/87 |
| 4,487,338 A | * | 12/1984 | Oshima .............. | B65G 47/1421 222/196 |
| 4,544,042 A | * | 10/1985 | Mikami ............... | G01G 13/024 177/108 |
| 4,553,617 A | * | 11/1985 | Tatematsu .............. | G01G 13/16 141/106 |
| 4,561,510 A | * | 12/1985 | Sugioka ............... | G01G 13/003 177/25.18 |
| 4,569,405 A | * | 2/1986 | Oshima ................ | G01G 19/393 177/25.18 |
| 5,038,875 A | * | 8/1991 | Kitagawa ............. | G01G 19/393 177/180 |
| 2004/0148056 A1 | * | 7/2004 | Baranowski ............ | B65B 37/04 700/240 |
| 2016/0370222 A1 | * | 12/2016 | Morimoto ............ | G01G 19/393 |
| 2017/0229262 A1 | * | 8/2017 | Horitani ................ | H01H 23/06 |

FOREIGN PATENT DOCUMENTS

JP 5-37745 5/1993

* cited by examiner

*Primary Examiner* — Natalie Huls
(74) *Attorney, Agent, or Firm* — Norris McLaughlin, P.A.

(57) ABSTRACT

A dispersing tray is mounted to a combination scale at a top part thereof to disperse and deliver supplied articles outwardly. The dispersing tray has, on a back surface thereof, a liquid stopper that prevents outward movement of a liquid.

8 Claims, 5 Drawing Sheets

DISPERSING TRAY AND COMBINATION SCALE COMPRISING THE SAME

BACKGROUND OF THE INVENTION

This invention relates to a dispersing tray constituting a dispersing feeder of a combination scale, and a combination scale equipped with the dispersing tray.

Conventionally, combination scales are structurally characterized as described below. A dispersing feeder radially disperses articles supplied therein and feed them into a plurality of linear feeders disposed around the dispersing feeder. The linear feeders linearly deliver the articles outwardly into a plurality of feeding hoppers disposed so as to face delivery ends of the linear feeders.

The feeding hoppers that received the articles from the linear feeders open their gates to feed the articles into a plurality of weighing hoppers disposed therebelow. The weighing hoppers weigh the articles received from the feeding hoppers. Then, the weighing hoppers execute combinatorial computations to select a combination of weighing hoppers containing the variously combined articles of a weight in total that falls within a predetermined range of weights. The weighing hoppers selected by the combinatorial computations open their gates to throw the articles into a collecting chute and then into a packaging machine therebelow.

Conventionally, the dispersing feeder includes a conically-shaped dispersing tray (dispersing table) and a vibration generator configured to vibrate the dispersing tray. As illustrated in the patent literature 1, the dispersing tray is removably mounted to a vibration head unit of the vibration generator. The dispersing tray is thus removable from the vibration head unit for cleaning whenever the need arises.

Published background art is, for example, JP 1993-37745 Y.

SUMMARY OF THE INVENTION

Mechanical apparatuses for food processing, including combination scales used to weigh and combine food, may have sections conventionally termed as "product zone" and "non-product zone". The product zone refers to sections in contact with food, while the non-product zone refers to sections that make no contact with food. The product zone in contact with food is butted for smooth mirror finish, so that the growth of various germs and bacteria is suppressed. On the other hand, the buffing is not a requirement for the non-product zone that stays out of contact with food.

In a combination scale for food applications, for example, the front surface of its dispersing tray in contact with supplied articles is conventionally buffed for smooth mirror finish. On the other hand, no particular polishing treatments is required of the back surface of the dispersing tray.

The dispersing tray of such a combination scale for food applications may be often removed from its body part for cleaning. In order to save down time, the cleaned dispersing tray is possibly remounted to the body part of the combination scale before it is fully dried.

Then, droplets of cleaning water left undried on the unpolished back surface of the dispersing tray may run toward its outer peripheral side as the dispersing tray is vibrated, dropping downward from the outer-peripheral end of the dispersing tray.

In the combination scale, the plural linear feeders that linearly deliver the articles by way of vibrations are disposed around the dispersing feeder, and edges of feeding troughs (feeder pans) constituting the linear feeders are situated under the outer-peripheral end part of the dispersing tray. Therefore, liquid droplets that arrived at the outer-peripheral end of the dispersing tray naturally drop downward into the delivery troughs of the linear feeders. This may be a problem from a hygienic point of view.

The liquid droplets running from the non-product zone may possibly contain foreign substances that are hygienically unacceptable.

Desirably, the back surface of the dispersing tray, conventionally included in the non-product zone though, is polished as well as the front surface of the dispersing tray; product zone. Further, the back surface with any welded section is desirably further processed by bead cutting.

A problem with this approach is a coupling mechanism attached to the back surface of the dispersing tray. The coupling mechanism is a required element to removably mount the dispersing tray to the vibration generator and/or other possible structural elements. It is a time-consuming and tiring work to perform polishing and bead cutting for all of structural elements of the coupling mechanism, demanding higher production costs. In addition to this polishing difficulty, the coupling mechanism includes joined parts of the respective elements that are even more difficult and costly to be polished.

To address these issues, this invention is directed to providing a dispersing tray excelling in hygiene and inexpensively producible, and a combination scale equipped with such a dispersing tray.

To this end, the invention is characterized as hereinafter described.

1) This invention provides a dispersing tray mountable to a combination scale at a top part thereof, the dispersing tray serving to disperse and deliver articles supplied therein outwardly, wherein the dispersing tray has, on a back surface thereof, a liquid stopper that prevents outward movement of a liquid.

After the dispersing tray according to this invention is removed from the main body of the combination scale for cleaning, the cleaned dispersing tray not fully dry yet may be remounted to the combination scale to start the operation sooner. Then, a liquid, such as cleaning water, may be left undried in an inner region than the liquid stopper on the back surface of the dispersing tray. When the combination starts to operate, the liquid may start to flow outwardly. Yet, the liquid may be blocked by the liquid stopper. It is thus prevented, that the liquid left in the inner region than the liquid stopper flows outwardly, running into the delivery troughs of the linear feeders disposed around the dispersing tray.

Therefore, unlike the front surface of the dispersing tray, polishing and/or bead cutting for any welded sections may be unnecessary for the inner region than the liquid stopper on the back surface of the dispersing tray.

2) In preferred embodiments of the dispersing tray according to the invention, the liquid stopper may be a member in the form of an annularly-arranged vertical wall.

According to these embodiments, a liquid, such as cleaning water, left undried in an inner region than the liquid stopper may be blocked by the liquid stopper annularly arranged like a wall. This may prevent that the liquid drops downward under its own weight from the lower end of the liquid stopper, flowing toward the outer region than the liquid stopper.

3) In other embodiments of the dispersing tray according to the invention, the dispersing tray may further have, on the back surface thereof, a coupling mechanism that allows the dispersing tray to be removably coupled to a vibration generator configured to vibrate the dispersing tray, wherein the liquid stopper is located on the back surface of the dispersing tray so as to surround an installation region of the coupling mechanism.

After the dispersing tray according to this invention is removed from the main body of the combination scale for cleaning, the cleaned dispersing tray not fully dry yet may be remounted to the combination scale to start the operation sooner. Then, a liquid, such as cleaning water, may be left undried in an inner region than the liquid stopper including the installation region of the coupling mechanism, and the liquid may start to flow outwardly as the dispersing tray is vibrated by the vibration generator. Yet, the liquid may be blocked by the liquid stopper. This may prevent that the liquid left in the inner region than the liquid stopper flows outwardly, running into the delivery trough of the linear feeders.

Therefore, unlike the front surface of the dispersing tray, polishing and/or bead cutting for any welded sections may be unnecessary for the installation region including the coupling mechanism that may need more time and labor to be polished.

4) In preferred embodiments of the dispersing tray according to the invention, the dispersing tray may include a tray body formed of a plate member conically shaped, and a reinforcing plate securely attached to the back surface of the tray body, the reinforcing plate having a disk-like shape and formed of a plate member thicker than the conically shaped plate member, wherein the liquid stopper and the coupling mechanism are provided on the reinforcing plate.

The reinforcing plate is thicker than the tray body and may be more difficult to deform. According to these embodiments, therefore, locating the liquid stopper on the reinforcing plate may be easier than locating the liquid stopper on the tray body more deformable during machining.

5) In other embodiments of the dispersing tray according to the invention, the liquid stopper may be formed by securely attaching an annular member separately provided to the reinforcing plate.

These embodiments may allow the liquid stopper to be located at an optional position to an optional height.

6) In other embodiments of the dispersing tray according to the invention, the liquid stopper may be located at a position on the reinforcing plate nearer to a center position of the tray body than a position at which the reinforcing plate is securely attached to the tray body.

According to these embodiments, the liquid stopper may be located on a flat part of the flat reinforcing plate. This may be easier than locating the liquid stopper on an inclined part of the conically-shaped tray body.

7) In other embodiments of the dispersing tray according to the invention, a surface to be polished may include a front surface of the dispersing tray and a region of the dispersing tray from an outer-peripheral end thereof to the liquid stopper on the back surface.

There is a circumferentially continuous, simply-shaped surface from the outer-peripheral end of the tray body to the lower end of the liquid stopper. According to these embodiments, this surface, if buffing is necessary, may be easily buffed as with the front surface of the tray body.

8) A combination scale according to this invention includes a dispersing feeder configured to radially disperse articles supplied therein and feed the articles outwardly; a plurality of linear feeders disposed around the dispersing feeder; a plurality of feeding hoppers disposed correspondingly to the linear feeders; and a plurality of weighing hoppers disposed correspondingly to the feeding feeders, wherein the dispersing feeder includes a dispersing tray mounted to the combination scale at a top part thereof and a vibration generator configured to vibrate the dispersing tray, and the dispersing tray has, on a back surface thereof, a liquid stopper that prevents outward movement of a liquid.

Conventionally, when the combination scale starts to operate after the cleaned dispersing tray is remounted thereto, a liquid used for cleaning, such as cleaning water, left undried on the back surface of the dispersing tray may flow into the linear feeders and drop on articles such as food. Such a risk, however, may be prevented in the combination scale according to this invention wherein the dispersing tray has, on its back surface, the liquid stopper serving to prevent the liquid from moving outwardly. Advantageously, articles, such, as food, may be hygienically weighed by this combination scale. Further advantageously, polishing may be unnecessary in this combination scale for the inner region of the dispersing tray than the liquid stopper.

9) In preferred embodiments of the combination scale according to the invention, the liquid stopper may be a member in the form of an annularly arranged vertical wall.

According to these embodiments, a liquid, such as cleaning water, left undried in an inner region than the liquid stopper may be blocked by the liquid stopper annularly arranged like a wall. This may prevent that the liquid drops downward under its own weight from the lower end of the liquid stopper, flowing toward the outer region than the liquid stopper.

10) In other embodiments of the combination scale according to the invention, the dispersing tray may further have, on the back surface thereof, a coupling mechanism that allows the dispersing tray to be removably coupled to a vibration generator configured to vibrate the dispersing tray, wherein the liquid stopper is located on the back surface of the dispersing tray so as to surround an installation region of the coupling mechanism.

After the dispersing tray according to this invention is removed from the main body of the combination scale for cleaning, the cleaned dispersing tray not fully dry yet may be remounted to the combination scale to start the operation sooner. Then, a liquid, such as cleaning water, may be left undried in an inner region than the liquid stopper including the installation region of the coupling mechanism, and the liquid may start to flow outwardly as the dispersing tray is vibrated by the vibration generator. Yet, the liquid may be blocked by the liquid stopper. This may prevent that the liquid left in the inner region than the liquid stopper flows outwardly, running into the delivery trough of the linear feeders.

Therefore, unlike the front surface of the dispersing tray polishing and/or bead cutting for any welded sections may be unnecessary for the installation region including the coupling mechanism that may need more time and labor to be polished.

11) In preferred embodiments of the combination scale according to the invention, the dispersing tray may include a tray body formed of a plate member conically shaped, and a reinforcing plate securely attached to the back surface of the tray body, the reinforcing plate having a disk-dike shape and formed of a plate member thicker than the conically shaped plate member, wherein the liquid stopper and the coupling mechanism are provided on the reinforcing plate.

The reinforcing plate is thicker than the tray body and may be more difficult to deform. According to these embodiments, therefore, locating the liquid stopper on the reinforcing plate may be easier than locating the liquid stopper on the tray body more deformable during machining.

12) In other embodiments of the combination scale according to the invention, the liquid stopper may be formed by securely attaching an annular member separately provided to the reinforcing plate.

These embodiments may allow the liquid stopper to be located at an optional position to an optional height.

13) In other embodiments of the combination scale according to the invention, the liquid stopper of the dispersing tray may be located at a position on the reinforcing plate nearer to a center position of the tray body than a position at which the reinforcing plate is securely attached to the tray body.

According to these embodiments, the liquid stopper may be located on a flat part of the flat reinforcing plate. This may be easier than locating the liquid stopper on an inclined part of the conically-shaped tray body.

14) In other embodiments of the combination scale according to the invention, a surface to be polished may include a front surface of the dispersing tray and a region of the dispersing tray from an outer-peripheral end thereof to the liquid stopper on the back surface.

There is a circumferentially continuous, simply-shaped surface from the outer-peripheral end of the tray body to the lower end of the liquid stopper. According to these embodiments, this surface, if buffing is necessary, may be easily butted as with the front surface of the tray body.

As described so far, the invention provides a dispersing tray excelling in hygiene and inexpensively producible, and a combination scale equipped with such an advantageous dispersing tray.

DETAILED DESCRIPTION OF THE INVENTION

A combination scale according to an embodiment of the invention is hereinafter described referring to the accompanying drawings.

Figure 1:
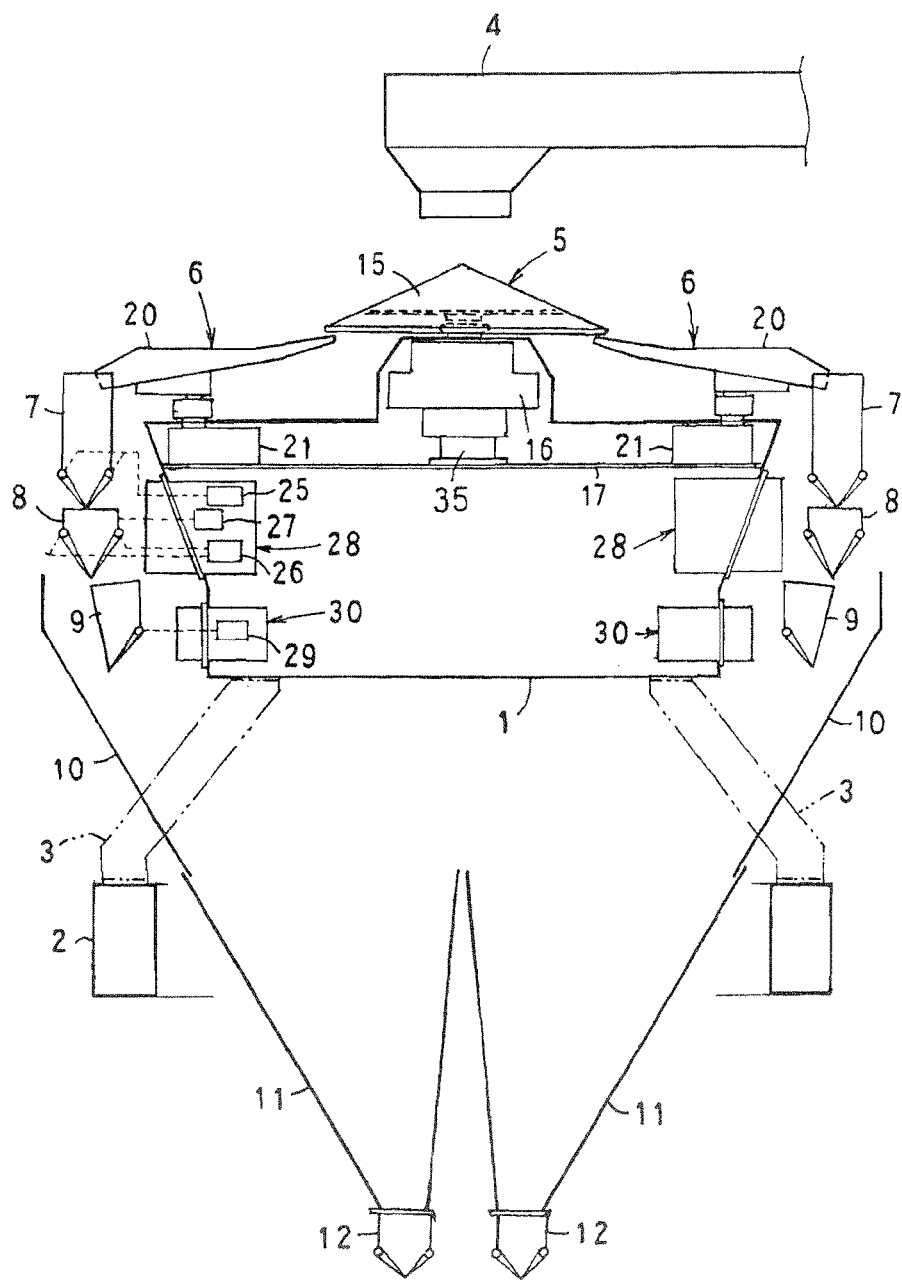
FIG. 1 is a schematic drawing of a combination scale according to an embodiment of the invention.
Figure 2:
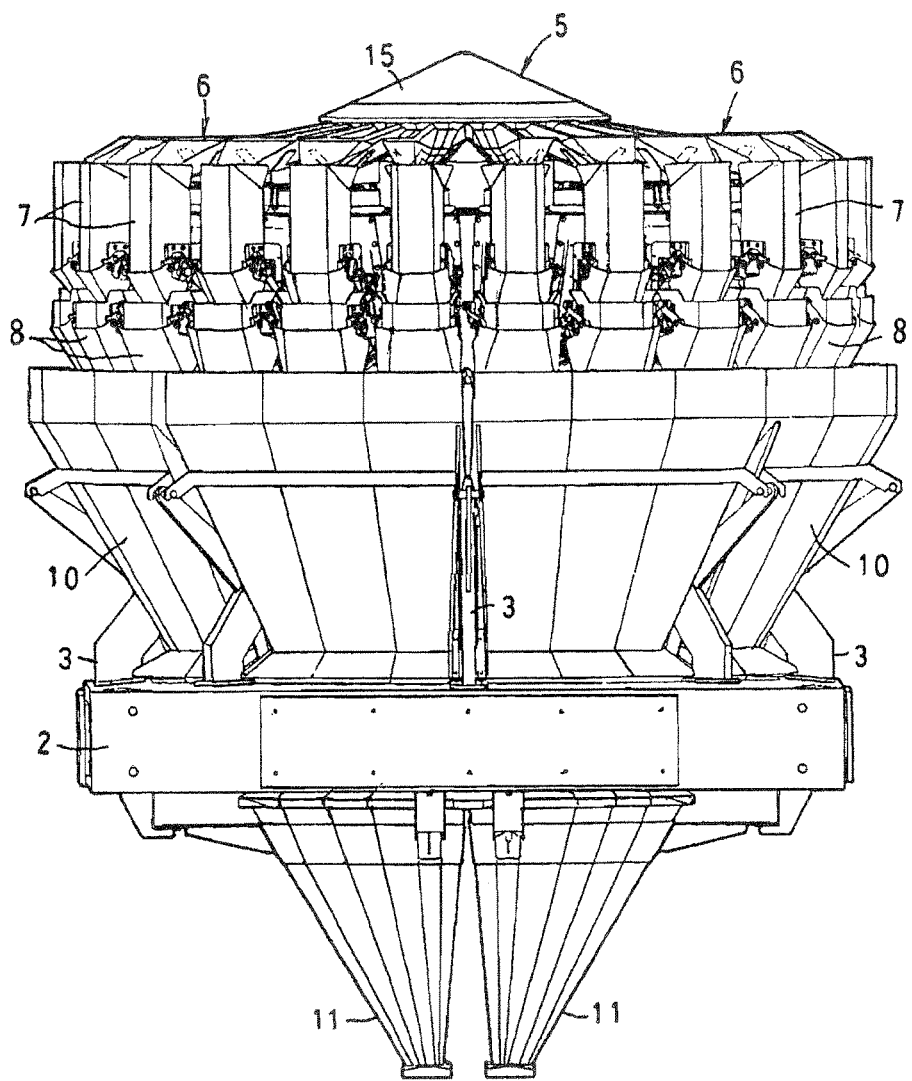
FIG. 2 is a front view of the combination scale illustrated in FIG. 1.
Figure 3:
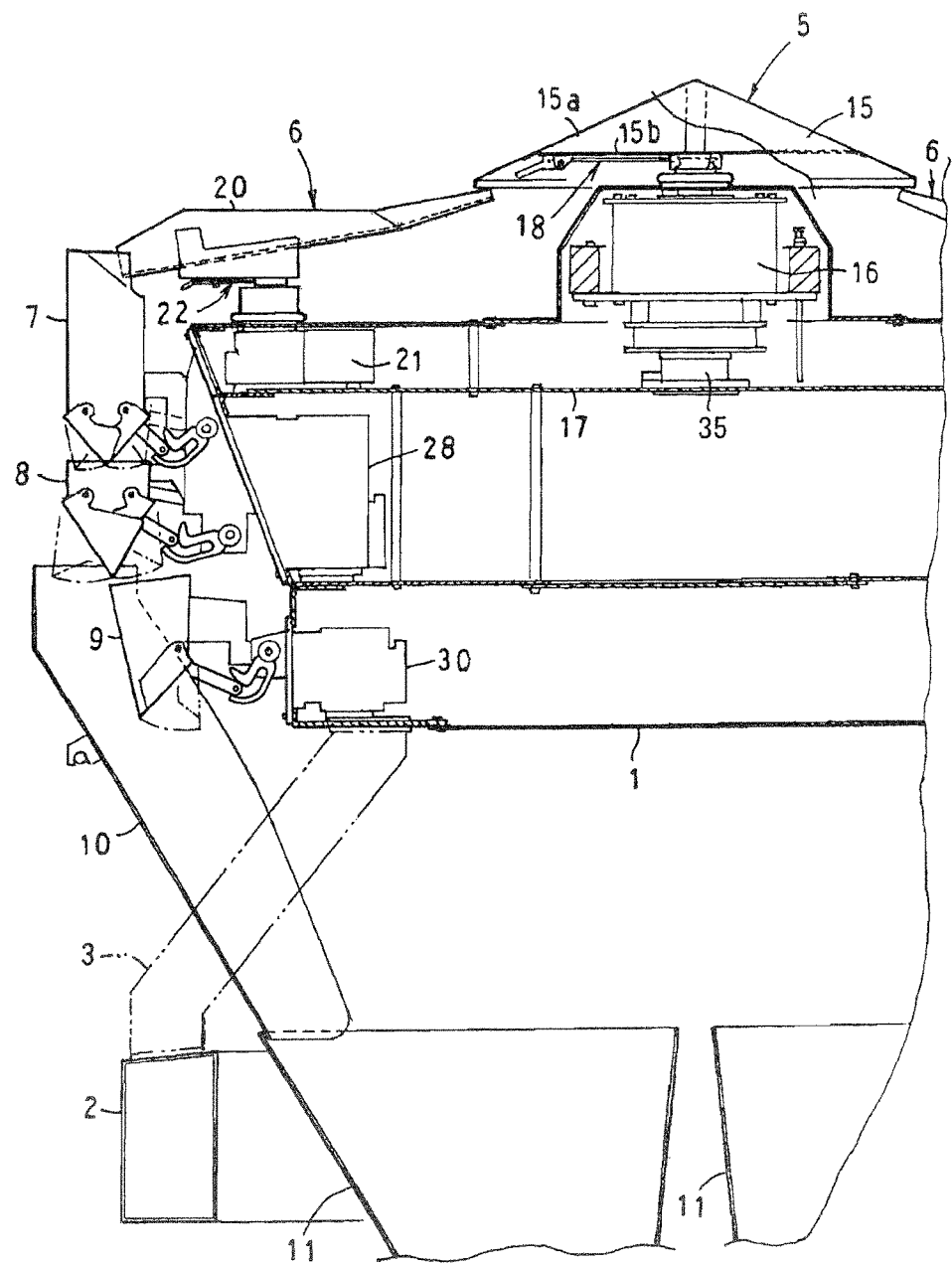
FIG. 3 is a longitudinal front view of a principal section of the combination scale illustrated in FIG. 2.

FIG. 1 is a schematic drawing of a combination scale according to an embodiment of the invention. FIG. 2 is a front view of the combination scale illustrated in FIG. 1. FIG. 3 is a longitudinal front view of a principal section of the combination scale.

The combination scale according to this embodiment is for use in a packaging line, where a predetermined quantity of articles to be weighed (hereinafter, simply referred to as articles), typically, food including candies and snacks, are weighed and thrown into a packaging machine, not illustrated in the drawings, to be packed in bags.

The combination scale has, at its center, a center base 1 having a hollow columnar shape. The center base 1 is supported by a rectangular base 2 with a plurality of legs 3 interposed therebetween. The base 2 has, at its center part, a large opening vertically penetrating therethrough. The base 2 is securely situated at a suitable position.

A dispersing feeder 5 is mounted to an upper part of the center base 1. The dispersing feeder 5 radially disperses, by way of vibrations, the articles dropping downward through an end port of a feeder 4 illustrated in FIG. 1. A large number of linear feeders 6 are radially disposed around the dispersing feeder 5. The linear feeders 6 respectively receive the articles dispersed and thrown therein, and then linearly deliver the articles outwardly by way of vibrations. Circumferentially around the center base 1 are; feeding hoppers 7 that temporarily store therein and discharge the articles received from the linear feeders 6, weighing hoppers 8 that store therein and weigh the articles discharged from the feeding hoppers 7, and memory hoppers 9 that receive and store therein the articles weighed by the weighing hoppers 8. The weighing, combinatorial computations, and discharge of the articles are carried out by multiple weighing modules (24 modules in this example) each consisting of a set of one linear feeder 6, feeding hopper 7, weighing hopper 8, and memory hopper 9.

In this example, of the multiple weighing modules (24 modules), one-quarter modules (six modules); four weighing systems in total, independently carry out the weighing, combinatorial computations, and discharge of the articles.

A collecting chute 10 is disposed below the weighing hoppers 8 and the memory hoppers 9. The collecting chute 10 collects the articles discharged from plural ones of the weighing hoppers 8 meeting a predetermined weight that are selected by the combinatorial computations, or the articles discharged from the memory hoppers 9. There are collecting funnels 11 below the collecting chute 10. The collecting funnels 11 collect the articles dropping downward from the collecting chute 10. Further below the collecting funnels 11 are collecting hoppers 12. The collecting hoppers 12 receive and temporarily store therein the articles collected in the collecting funnels 11, as illustrated in FIG. 1. The collecting hoppers 12 are opened in response to a discharge request command outputted from the packaging machine.

The dispersing feeder 5 has a conically-shaped dispersing tray 15 located at a top part of the combination scale, and an electromagnetic vibration generator 18. The vibration generator 16 is a driving mechanism configured to vibrate the dispersing tray 15. The vibration generator 16 is located at the center on a support frame 17 arranged inside the center base 1. The vibration generator 16 is coupled to and supported by a weight sensor 35 set on the support frame 17. The weight sensor 35 detects the weight of articles received in the dispersing feeder 5. The detected information is inputted to a controller not illustrated in the drawings. The controller, based on the detected information, turns on or off the feeder 4, thereby constantly feeding the dispersing feeder 5 with the articles of a weight that falls within a preset range of weights.

Figure 4:
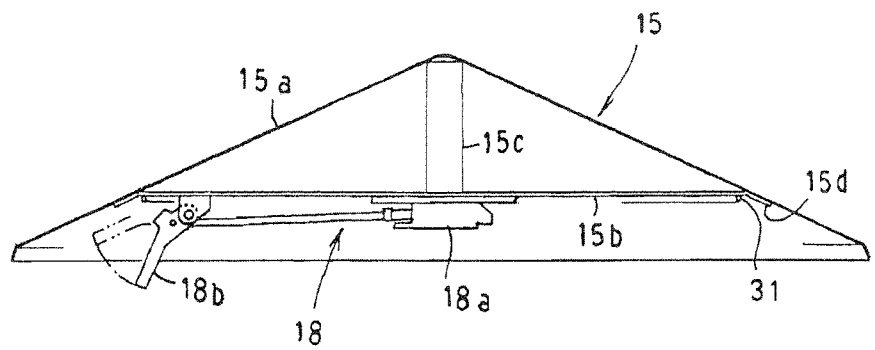
FIG. 4 is a longitudinal sectional view of a dispersing tray.
Figure 5:
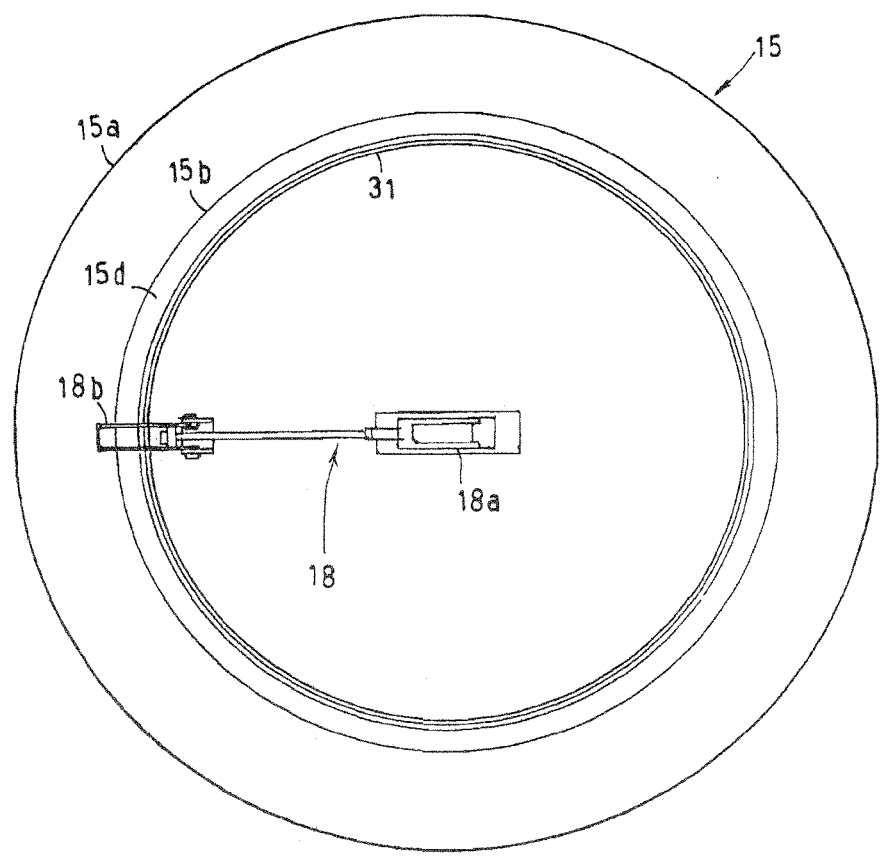
FIG. 5 is a bottom view of the dispersing tray.

As illustrated in FIGS. 4 and 5, the dispersing tray 15 includes a tray body 15a formed of a conically-shaped thin plate member, and a disc-shaped reinforcing plate 15b formed of a plate member thicker than the tray body 15a, wherein the reinforcing plate 15b is welded and fixed to the back-surface side of the tray body 15a along its whole circumference. A columnar support 15c is standing upright at the center on the upper surface of the reinforcing plate 15b, and an upper end of the columnar support 15c and a top part of the tray body 15a are welded and fixed to each other.

On the lower surface of the reinforcing plate 15 is disposed a buckle-type coupling mechanism 18 that allows the dispersing tray 15 to be removably coupled to a vibration head unit at an upper end of the vibration generator 16. The reinforcing plate 15b is generally flat, and has, in its outer-peripheral part, an attachable tapered part 15d tailored to a degree of inclination of the tray body 15a. The attachable tapered part 15d is securely attached by filler welding to the back surface of the tray body 15a.

With a metal fixture 18a of the coupling mechanism 18 being positioned to and fitted in the vibration head unit at the upper end of the vibration generator 16, an operation lever 18b of the coupling mechanism 18 is swung upward beyond a dead point. This movement allows a cramping fitment (not illustrated in the drawings) of the metal fixture 18a to slide to a fastening position to be locked there. On the other hand, the cramping fitment is unlocked when the operation lever 18 is swung downward beyond the dead point.

As illustrated in FIGS. 1 and 3, the linear feeders 6 each include a delivery trough (feeder pan) 20 having a groove extending inward and outward, and a vibration generator 21 configured to electromagnetically vibrate the delivery trough 20. The vibration generator 21 of each linear feeder 6 is attached to the support frame 17 so as to surround the vibration generator 16 of the dispersing feeder 5. As illustrated in FIG. 3, the delivery troughs 20 are mountable to and removable from the vibration head unit of the vibration generator 21 by operating the lever of the buckle-type coupling mechanism 18 on the back-surface side of the delivery trough 20.

As illustrated in FIGS. 1 and 3, the combination scale has, on the circumferential wall of the center base 1, drive units 28 respectively housing therein motors 25 and 26 that drive gates of the feeding hoppers 7 and weighing hoppers 8 to open and close, and weight sensors 27 that weigh the articles in the weighing hoppers 8. The feeding hoppers 7 and the weighing hoppers 8 are removably mounted with hooks to and thereby supported by outwardly exposed sections of the drive units 28. Underneath the drive units 28, there are drive units 30 respectively housing therein motors 29 that drives gates of the memory hoppers 9 to open and close. The memory hoppers 9 are removably mounted with hooks to and thereby supported by outwardly exposed sections of the drive units 30.

In the combination scale according to this embodiment, the dispersing tray 15 of the dispersing feeder 5 is structurally characterized as below.

Figure 6:
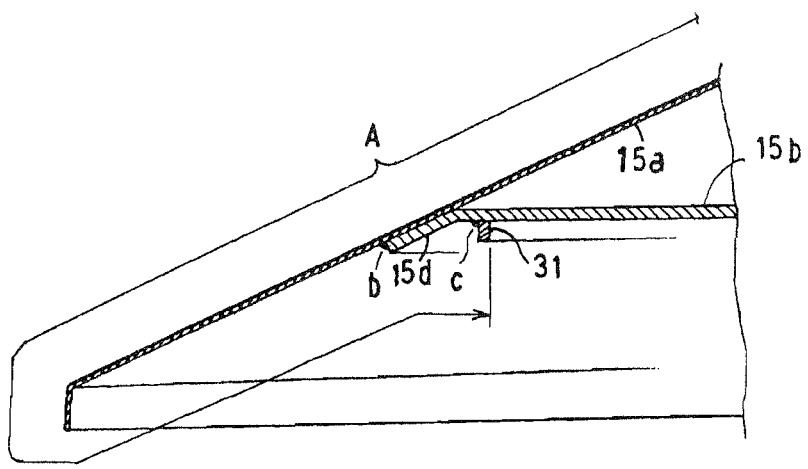
FIG. 6 is an enlarged longitudinal sectional view of a principal section, illustrating a liquid stopper.

In the dispersing tray 15, as illustrated in FIGS. 4 to 6, a liquid stopper 31 is vertically standing on the lower surface of the reinforcing plate 15b on the back-surface side of the tray body 15a so as to surround the installation region of the coupling mechanism 18. The liquid stopper 31 is a member in the form of an annularly-arranged vertical wall. This member is formed to a height of several millimeters by welding an angular rod stock toroidally formed to the lower surface of the reinforcing plate 15b.

As described earlier, the flat reinforcing plate 15b has, in its outer-peripheral part, the attachable tapered part 15d tailored to a degree of inclination of the tray body 15a. The liquid stopper 31 that prevents outward movement of a liquid, such as cleaning water, is securely attached by filler welding to a flat part of the reinforcing plate 15b on the inner side than the attachable tapered part 15d.

As illustrated in FIG. 6, the front surface of the tray body 15a and a region A from the outer peripheral end of the tray body 15a to the lower end of the liquid stopper 31 are polished by, for example, buffing. A welded section b between the tray body 15a and the reinforcing plate 15g, and a welded section c between the reinforcing plate 15b and the liquid stopper 31 are processed by bead cutting. On the other hand, the lower surface of the reinforcing plate 15b and the members constituting the coupling mechanism 18 in an inner region than the liquid stopper 31 are left unpolished.

According to this embodiment, when the dispersing tray 15 removed from the vibration generator 16 for cleaning is remounted to the vibration generator 16 before it is fully dried, a liquid, such as cleaning water, left in the inner region than the liquid stopper 31 may start to flow outwardly by way of vibrations. The liquid stopper 31, however, serves to block the liquid, leading the liquid to drop downward under its own weight from the lower end of the liquid stopper 31. It is thus prevented that the liquid, such as cleaning water, left in the inner region than the liquid stopper 31 flows outward, running into the delivery troughs 20 of the linear feeders 6.

The liquid, such as cleaning water, left in the inner region than the liquid stopper 31, i.e., unpolished non-product zone, may be blocked from reaching the polished region on the outer side than the liquid stopper 31. This may eliminate the risk of the liquid running into the product zone; delivery troughs 20 of the linear feeders 6.

Other Embodiments

Figure 7:
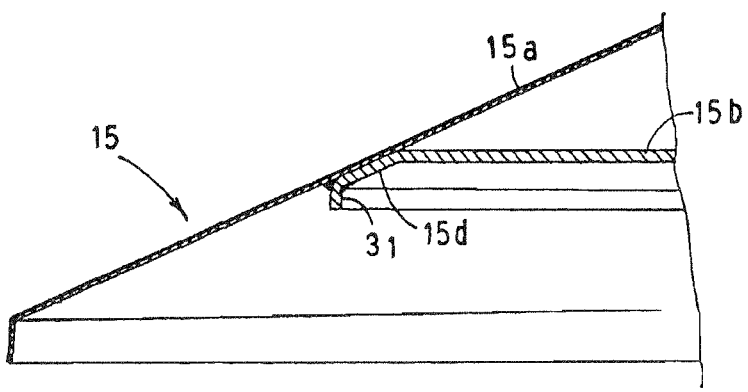
FIG. 7 is an enlarged longitudinal sectional view of a principal part, illustrating another embodiment of the liquid stopper.

This invention may be implemented as described below.
1) On the outer side than the reinforcing plate 15b, the liquid stopper 31 may be directly attached to the back surface of the tray body 15a.
2) As illustrated in FIG. 7, the outer peripheral edge of the reinforcing plate 15b of the dispersing tray 15 may be bent downward to form the liquid stopper 31 and the reinforcing plate 15b into an integral unit.
3) The annularly-arranged liquid stopper 31 may not necessarily refer to a circular configuration but may refer to a rectangular configuration. The metal fixture 18a of the coupling mechanism 18 is fitted in the vibration head unit of the vibration generator 16, which is particularly difficult to be polished. The liquid stopper 31 may be annularly arranged so as to surround a center region where the metal fixture 18a is located, in which case the reinforcing plate 15b and the coupling mechanism 18 on the outer side than the liquid stopper 31 are polished.
4) By having the lower end of the liquid stopper 31 be sharpened like a knife edge, the liquid to be discharged running downward along the inner periphery of the liquid stopper 31 may, instead, of travelling around the outer-peripheral side of the liquid stopper 31, drop downward directly from the sharpened edge.
5) According to the embodiments described so far, the dispersing tray 15 is vibrated to disperse and deliver the articles. Instead, the dispersing tray 15 may be pivoted around a vertical axis passing through its center, so that the supplied articles are radially dispersed and delivered centrifugally.

The invention claimed is:
1. A dispersing tray mountable to a combination scale at a top part thereof, the dispersing tray serving to disperse and deliver articles supplied therein outwardly,
the dispersing tray comprising:
a tray body formed of a plate member conically shaped, and
a reinforcing plate securely attached to a back surface of the tray body, the reinforcing plate having a disk shape and being formed of a plate member that is thicker than the plate member of the tray body, wherein the dispersing tray has, on a back surface thereof, a liquid stopper that prevents outward movement of a liquid, wherein a coupling mechanism is disposed on a lower surface of the reinforcing plate, the coupling mechanism allowing the dispersing tray to be removably coupled to a vibration head unit at an upper end of a vibration generator configured to vibrate the dispersing tray, and wherein the liquid stopper has a form of an annularly-arranged vertical wall and is vertically standing on the lower surface of the reinforcing plate so as to surround an installation region of the coupling mechanism.

2. The dispersing tray as claimed in claim 1, wherein the liquid stopper is formed by securely attaching an annular member separately provided to the reinforcing plate.

3. The dispersing tray as claimed in claim 2, wherein the liquid stopper is located at a position on the reinforcing plate nearer to a center position of the tray body than a position at which the reinforcing plate is securely attached to the tray body.

4. The dispersing tray as claimed in claim 1, wherein a surface to be polished includes a front surface of the dispersing tray and a region of the dispersing tray from an outer-peripheral end thereof to the liquid stopper on the lower surface of the reinforcing plate of the dispersing tray.

5. A combination scale, comprising:

a dispersing feeder configured to radially disperse articles supplied therein outwardly;

a plurality of linear feeders disposed around the dispersing feeder;

a plurality of feeding hoppers disposed correspondingly to the linear feeders; and a plurality of weighing hoppers disposed correspondingly to the feeding hoppers, wherein the dispersing feeder includes:

a dispersing tray mounted to the combination scale at a top part thereof; and a vibration generator configured to vibrate the dispersing tray, wherein the dispersing tray comprises:

a tray body formed of a plate member conically shaped; and a reinforcing plate securely attached to a back surface of the tray body, the reinforcing plate having a disk shape and being formed of a plate member that is thicker than the plate member of the tray body, wherein the dispersing tray has, on a back surface thereof, a liquid stopper that prevents outward movement of a liquid, wherein a coupling mechanism is disposed on a lower surface of the reinforcing plate, the coupling mechanism allowing the dispersing tray to be removably coupled to a vibration head unit at an upper end of a vibration generator configured to vibrate the dispersing tray, and wherein the liquid stopper has a form of an annularly-arranged vertical wall and is vertically standing on the lower surface of the reinforcing plate so as to surround an installation region of the coupling mechanism.

6. The combination scale as claimed in claim 5, wherein the liquid stopper is formed by securely attaching an annular member separately provided to the reinforcing plate.

7. The combination scale as claimed in claim 6, wherein the liquid stopper of the dispersing tray is located at a position on the reinforcing plate nearer to a center position of the tray body than a position at which the reinforcing plate is securely attached to the tray body.

8. The combination scale as claimed in claim 5, wherein a surface to be polished includes a front surface of the dispersing tray and a region of the dispersing tray from an outer-peripheral end thereof to the liquid stopper on the back surface.

* * * * *